United States Patent [19]

Pliml et al.

[11] 4,103,854
[45] Aug. 1, 1978

[54] SUPPORT FASTENER

[75] Inventors: Frank V. Pliml, Arlington Heights; Lloyd A. Erickson, Park Ridge, both of Ill.

[73] Assignee: Illinois Tool Works Inc., Chicago, Ill.

[21] Appl. No.: 788,727

[22] Filed: Apr. 19, 1977

[51] Int. Cl.² .............................................. F16M 13/00
[52] U.S. Cl. ................................ 248/235; 248/221.3; 248/222.2; 248/223.1
[58] Field of Search ............... 248/73, 203, 221.3, 248/235, 239

[56] References Cited

U.S. PATENT DOCUMENTS

| | | | |
|---|---|---|---|
| 2,265,957 | 12/1941 | Tinnerman | 248/239 X |
| 2,618,033 | 11/1952 | Tinnerman et al. | 248/73 |
| 2,640,672 | 6/1953 | Bedford | 248/239 |
| 2,896,897 | 7/1959 | Schlueter | 248/239 |
| 3,253,084 | 5/1966 | Taylor | 248/73 |
| 3,375,749 | 4/1968 | Coldren et al. | 85/80 |
| 3,532,311 | 10/1970 | Havener | 248/73 |
| 3,628,762 | 12/1971 | Williams | 248/235 |
| 3,954,243 | 5/1976 | Sharp | 248/235 |

*Primary Examiner*—William H. Schultz
*Attorney, Agent, or Firm*—Jack R. Halvorsen; Robert W. Beart

[57] ABSTRACT

A one-piece plastic fastener for supporting secondary members relative to a thin panel in a shouldered, non-circular aperture. The fastener provides a wide distribution of stress loading by a large hook-like prong which is rotated into contact with the backside of the panel by telescoping it through the aperture until the head covers the aperture. A resilient non-loadbearing arm extends from the prong in a curved or angular relationship for engagement with two adjacent edges of the non-circular aperture to permanently prevent unintentional retrograde motion of the fastener. The fastener is non-removeable due to the locking of the notch in the arm with the side edge of the non-circular aperture.

2 Claims, 10 Drawing Figures

SUPPORT FASTENER

BACKGROUND OF THE INVENTION

This invention is an improvement on the support fastener shown in U.S. Pat. No. 3,954,243 issued May 4, 1976. The background of this invention is substantially identical to the prior art mentioned in U.S. Pat. No. 3,954,243, except the support fastener shown and claimed in U.S. Pat. No. 3,954,243 is removeable by insertion of a thin, blade-like member under the head to permit resilient distortion of the retaining arm. There are situations, which have been found by the common assignee of that patent and this application, which require that the support fastener be permanently and non-removeably installed in the panel.

SUMMARY OF THE INVENTION

The present invention relates to a one-piece thermoplastic device which has the unique ability of distributing high shear loads and tortional loads directly to the supporting panel structure.

Another object of the present invention is to provide an economical, one-piece, hand-insertable fastener which is simple in construction but which overcomes the deficiencies of the prior art by wide distribution of stress forces commonly incurred in the applications involved.

A further object of the present invention is to provide a fastener which is compatible for useage with thin panels which are backed by a foamed insulation material and which are capable of displacing the foamed material in such a fashion that the fastener will be permanently seated without the use of any secondary preparation by the operator.

Still another object of the present invention is to provide a prong configuration which is acceptable in a non-circular aperture in the panel, said aperture having a large upper portion interconnected by a communicating slot to thereby provide one or more shoulders adjacent the slot for distribution of shear loads through adequate shoulder means in the fastener per se as well as to accept a distortable retaining arm in the communicating slot which is distorted during insertion and snaps back substantially to its original configuration to catch not only the end of the slot but a side wall of the slot in non-removeable fashion. Other objects of the invention will become apparent to those skilled in the art when the specification is read in conjunction with the drawings.

DETAILED DESCRIPTION OF THE PREFERRED EMBODIMENT

Figure 1:
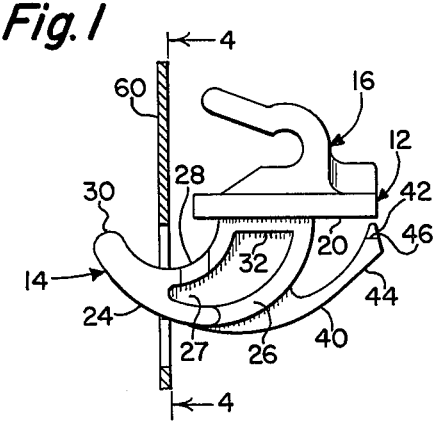
FIGS. 1, 5, 7 and 9 are side elevational views in partial section showing the various stages of installation of the preferred embodiment of the present invention.

Referring now to the drawings wherein similar parts are identified by similar numerals, the fastener 10 includes a head 12, a stud 14, and a support means 16 extending from the head 12 in a direction opposite to that of the stud 14.

The head 12 in this preferred embodiment is a generally flat planar member having a rear surface 20 which serves as a reference, for purposes best set forth hereinafter. It will be recognized that the rear surface 20 could include, although not shown, a thin sealing flange or a series of protuberances arranged in such a fashion as to also serve as a reference for contacting the support with which it is associated. The stud 14 includes a substantially rigid curved hook-like member 24 which is integrally connected to the head 12 and extends outwardly and is thence reversely bent toward the rear surface 20 with the free end of said hook-like stud extending beyond an edge margin of said base and terminating in space relation to said reference, for purposes best set forth hereinafter. The hook-like member, for economies in manufacture, generally is defined by a pair of ribs with the outer rib 26 defining a convex surface while the inner rib 28 defines a concave surface, with the ribs 26 and 28 being joined by a central web 27 and terminating in a rounded nose or free end 30. The hook-like member 24 has substantial width which is preferably less than the width of the head 12 and terminates adjacent the rear surface 20 in a solid section 32 forming a rigid shoulder means adjacent rear surface 20 capable of carrying substantial shear loads. Extending integrally from the outer rib 26 in a curved fashion toward the rear surface 20 is a resilient retaining arm 40 which is narrower than stud 24 and terminates in space relation to the back surface 20 with a cammed shoulder end 42.

In the present embodiment, the arm 40 initially is substantially parallel to the side edges of the hook-like member 24 and thence is curved or angularly disposed off to one side of its initial position, as designated by the portion 44. This canted portion 44 terminates in the cammed shoulder end 42 which adjacent one edge of the arm is relieved by a recess 46, for purposes best set forth hereinafter.

In the present embodiment the head 12 is provided on its front surface with a support means 16 in the form of a hook-like element for accepting a secondary element, such as a wire shelf, although many various forms of support means shown in the fastening art generally or as shown in U.S. Pat. No. 3,954,243, and not shown in this patent application, can be carried by head 12.

The fastener 10 described above is capable of being utilized with a thin support panel 60 having a non-circular aperture 62. The aperture 62 in the preferred embodiment has a large upper portion 64 and a lower communicating slot 66, with the margins of the aperture adjacent its juncture with the slot 66 forming at least one supporting shoulder means 68. The width of the upper portions 64 is substantially equal to the width of the hook-like portion 24 while the slot 66 is substantially equal in width to the resilient arm 40.

Figure 2:
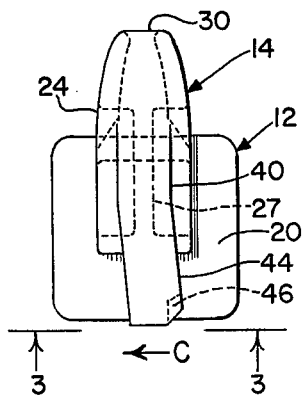
FIG. 2 is an elevational view from the backside of the base showing the canted or laterally shiftable retaining arm.
Figure 3:
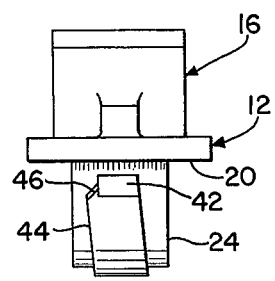
FIG. 3 is a bottom end view taken along lines 3—3 of FIG. 2.
Figure 5:
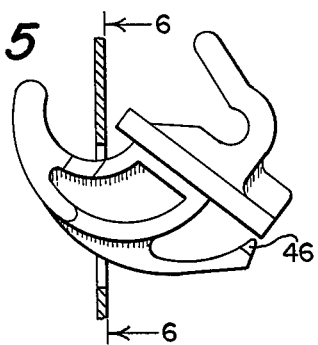
Figure 4:
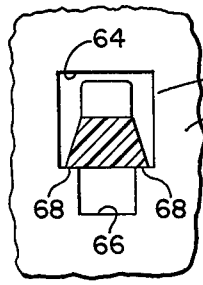
FIGS. 4, 6, 8 and 10 are front elevational views in partial section taken along lines 4—4 in FIG. 1; lines 6—6 in FIG. 5; lines 8—8 in FIG. 7; and lines 10—10 in FIG. 9, respectively.
Figure 7:
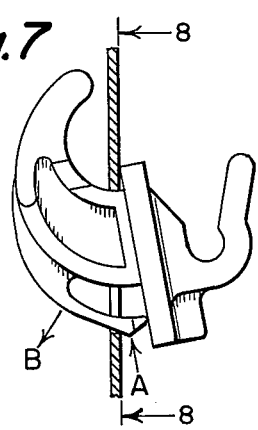
Figure 6:
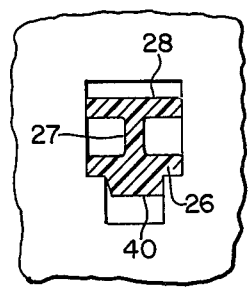

Referring now to FIGS. 1 and 4 through 10, the operation of the fastener is such that the rounded nose 30 is introduced in the upper portion 64 of aperture 62 by lateral telescoping through the panel 60 and then rocked or rotated with the trailing resilient arm 40 moving within the slot portion of aperture 62. As the fastener is rotated into the hole, the flexible arm 40 is deflected laterally when its canted portion 44 contacts the side margins of the slot 66, as viewed in the figures, until such time as its end 44 contacts the bottom of the slot 66 at which time the arm is also deflected toward the convex rib 26. The rotation of the fastener is continued until the rounded nose 30 contacts the rear of the panel 60 and the reference surface 20 contacts the front of the panel 60, at which time the canted portion 44 snaps laterally to the side with the edge of the slot 66 being captured in the cut-out 46 at the end of the arm 40. The flexible arm 40 must slide along the rear surface 20 in the direction of the arrow A and must bow in the direction of the arrow B, as best seen in FIG. 7, and must flex laterally in the direction of the arrow C, as seen in FIG. 2, as it contacts the vertical edge of the slot 66 until such time as the free end of the arm clears the rear panel 60 whence the canted portion 44 of the arm 40 will spring back in the direction opposite to the arrow C in FIG. 2.

Figure 9:
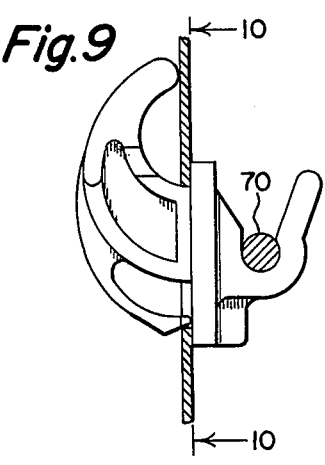
Figure 8:
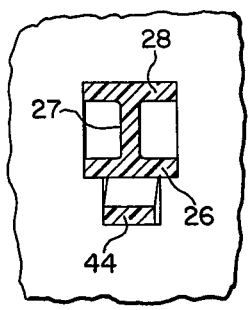
Figure 10:
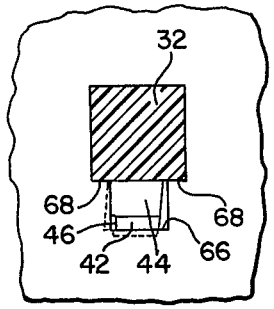

When the head is finally seated on the panel, as seen in FIGS. 9 and 10, the rounded free end 30 of the hook-like member 24 is in contact with the rear or left side of panel 60, as seen in the drawing. The hook-like prong or stud 14 provides resistance to torsional loads induced by forces appled to support 16 by distributing the forces over a large area of the panel 60 while the solid section or shoulder portion 32, under the head, fills the upper portion 64 and rests on the shoulder 68, as best seen in FIG. 10, to provide high resistance to shear loads in a downward vertical direction, as seen in the drawings, as well as to forces applied in other directions in the plane of the panel 60. The flexible arm 40, with its canted portion 44 and its cut-out 46, engages the lower edge of the slot portion 66 with its cammed end 42 and is made non-removeable by engagement of the cut-out 46 with side edges of the slot portions 66. Since the backside of panel 60 is normally a blind application, no means of access generally being available, the notch 46 engaging the side edge of slot 60 makes this fastener a non-removeable fastener.

The preferred embodiment described hereinabove can be readily manufactured from available thermoplastic materials by injection molding techniques known in the art. The configuration of the prong is such as to provide rigid characteristics for resistance of tortional and shear loads while the same material, as an integral part of the entire fastener, when reduced in section will provide a resilience to the arm 40 so that its canted portion 44 can be laterally moved and will spring back to lock the fastener in mounted position. The supporting means generally designated 16 can be either resilient, when used in a hook-like configuration as illustrated in this embodiment, or rigid by introducing heavier sections well known in the art and not shown.

It will be appreciated by those skilled in the art that a cooperative configuration arrangement, namely the use of this stud configuration with a variety of head configurations, will provide economies in manufacture. A single stud and head mold cavity could be utilized with an infinite variety of support designs, thereby providing a customer with a single fastener that will accept various supports as demanded by the style of a particular refrigerator, freezer, etc. with which it is to be used.

I claim:

1. A one-piece plastic fastener in combination with a non-circular aperture in a panel, said fastener including a base adapted to cover said aperture and having rear surface means defining a reference for engaging the panel and support means on the opposite surface of said base adapted to engage secondary means, an integral substantially rigid curved hook-like stud which extends outwardly from a root portion adjacent the rear surface of said base and thence reversely bends toward said reference with the free end of said hook-like stud extending beyond an edge margin of said base and terminating in spaced relation to said reference a predetermined distance so that said base rear surface means contacts one surface of said panel while said free end will contact the opposite surface of said panel, said root of said stud having a cross-sectional configuration which at least at a plurality of points is complementary to said aperture and provides shoulder means adjacent to said base which in installed position engages in load-bearing relationship walls of the panel forming said aperture so as to substantially prevent any motion of said fastener in the plane of said panel, and resilient nonload-bearing retaining means carried by said stud and cooperating with said aperture to lock said fastener in non-removeable installed relation with said panel, the aperture in said panel including an enlarged upper portion for accepting said rigid shoulder means of said hook-like stud in complementary loadbearing relation and a communicating slot of smaller size having side and bottom end edges for accepting said retaining means in overlying relation to two adjacent edges thereof, said hook-like stud including a convex exterior surface facing away from said base and a concave recess facing said reference, said retaining means being a resilient arm connected at one end to said convex surface intermediate its length and extending initially generally parallel to said hook-like stud and thence being canted laterally to its free end from said initial position and extending toward said base, the canted free end portion of said retaining arm including a recess along one edge of said arm facing said reference which accepts and overlies a side edge of said slot means and with the free end of said arm overlying said bottom end edge to thereby make said retaining arm nonremoveable.

2. A fastener of the type claimed in claim 1 wherein the aperture in said panel is generally T-shaped.

* * * * *